United States Patent

[11] 3,625,190

[72] Inventor Mathew G. Boissevain
 27181 Sherlock Road, Los Altos Hills, Calif. 94022
[21] Appl. No. 16,714
[22] Filed Mar. 5, 1970
[45] Patented Dec. 7, 1971

[54] FUEL VAPORIZER
5 Claims, 6 Drawing Figs.

[52] U.S. Cl. ..................................................... 123/122AC, 123/122 F
[51] Int. Cl. ..................................................... F02m 31/08, F02m 31/12
[50] Field of Search ........................................ 123/122, 122 AB, 122 AC, 122 F, 133, 142; 165/52, 133, 142.5, 179

[56] References Cited

UNITED STATES PATENTS

| | | | |
|---|---|---|---|
| 1,064,866 | 6/1913 | Stewart | 123/122 UX |
| 1,479,567 | 1/1924 | Horning | 165/52 |
| 1,691,615 | 11/1928 | Smith | 123/122 A3 X |
| 1,706,845 | 3/1929 | Eynon | 123/122 A3 UX |
| 1,744,319 | 1/1930 | Link | 123/122 A3 |
| 1,777,472 | 10/1930 | Mock et al. | 123/122 A2 UX |
| 2,700,722 | 1/1955 | Gurley | 123/122 F X |
| 2,719,520 | 10/1955 | Balzer et al. | 123/122 F |

FOREIGN PATENTS

| | | | |
|---|---|---|---|
| 115,481 | 7/1942 | Australia | 165/133 |
| 387,828 | 2/1933 | Great Britain | 165/133 |
| 563,895 | 9/1944 | Great Britain | 123/122 A3 |

Primary Examiner—Al Lawrence Smith
Attorney—Allen and Chromy

ABSTRACT: A rapid start fuel vaporizer for internal combustion engines employing a very rapid-acting heat exchanger that is heated either electrically or by exhaust gases or both to selectively vaporize the heavier fuel droplets which drop into the intake manifold from the engine carburetor without increasing intake air temperature. This vaporizer assembly is attached to the underside of the intake manifold directly below the downdraft carburetor and it is provided with a membrane of thin stainless steel or other material that resists oxidation caused by heating. A honeycomb, grid pattern, or closed convolutions between membrane and carburetor stagnates the intake air directly above the membrane, thus reducing heat transfer from the membrane surface to the intake air.

PATENTED DEC 7 1971  3,625,190

INVENTOR.
MATHEW G. BOISSEVAIN
BY
ATTORNEYS

FUEL VAPORIZER

DESCRIPTION OF THE INVENTION

This invention relates to a rapid start fuel vaporizer for internal combustion engines.

An object of this invention is to provide an improved device to vaporize the fuel supplied to the cylinders of an internal combustion engine to reduce the smog due to incomplete combustion of the fuel in the engine, especially immediately after startup when the engine normally requires severe choking to operate smoothly.

Another object of this invention is to provide an improved fuel vaporizer for use on internal combustion engines, said vaporizer being constructed to function immediately at startup of the engine and also thereafter during normal operation.

Another object of this invention is to provide a rapid fuel vaporizer for internal combustion engines to vaporize the fuel droplets coming from the downdraft carburetor without significantly heating the intake air of the engine.

Another object of this invention is to eliminate the manifold valve presently a source of mechanical failure on six-cylinder engines.

Another object of this invention is to provide a fuel vaporizer on an internal combustion engine which improves the starting of the engine in cold weather and which permits full power acceleration of the engine within seconds after the engine starts up even in cold weather, and without choking.

Still another object of this invention is to provide improved fuel distribution to all cylinders of a multicylinder engine to improve the efficiency of operation thereof and to permit operation at lower air fuel ratios, thereby reducing air pollution.

Other and further objects of this invention will be apparent to those skilled in the art to which it relates from the following specification, claims and drawing.

It is known that carburetors of internal combustion engines release a mixture of fuel vapor and droplets into the intake manifold which is directly below the carburetor and that less than one half the gasoline released into the intake manifold is actually vaporized as it leaves the carburetor. Some of the droplets of gasoline enter the engine cylinders and due to their low surface to volume ratio they are incompletely combusted in the short time available in the operating cycle which may be on the order of one two-hundredth of a second. This incomplete combustion is especially a problem in the first 10 minutes or so of engine operation, depending upon the atmospheric temperature, and the operation with choke, i.e., rich mixtures, and is therefore a major cause of smog. This has been alleviated to some extent in six-cylinder engines by heating the intake manifold with exhaust gases or bypass water from the cooling system to effect better fuel vaporization. This method however is slow, due to the large heat mass of the heat riser, and will generally require 10 minutes or more which is many times a large part of the average car trip. Another difficulty resides in the fact that once the intake manifold of the engine has become hot it heats the intake air and thus, reduces the number of air-fuel molecules that enter each engine cylinder so that as a result horsepower and efficiency of the engine is reduced. To eliminate this problem a thermostatically controlled valve has been installed in some six-cylinder engines so that the exhaust gases may bypass the heat riser to reduce the heating thereof. This valve however is located directly in the exhaust system and normally corrodes open or shut after a period of engine operation so that it becomes inoperative for the purpose intended. Another problem is that raw liquid gasoline flows uncontrolled into various manifold passages, thus causing unequal vapor distribution to the various cylinders.

In the present invention there is provided a very rapidly acting heat exchanger to capture and receive the heavier fuel droplets as they leave the carburetor. This heat exchanger is heated either electrically or by the exhaust heat, and heat-insulating devices are provided above and below this heat exchanger to reduce heat transfer to the intake air and to the intake manifold. This vaporizer is provided with either a convoluted or curved membrane which is approximately two times the diameter of the carburetor outlet so that it will catch fanned out fuel droplets as they emerge from the carburetor. On one version of the membrane these convolutions are shaped to provide good heat transfer to the fuel droplets and also to provide beam strength to the diaphragm so as to withstand the differential pressure between the exhaust or intake manifolds. An additional purpose of these pockets is to cause stagnation of the intake air, and thus reduce heat transfer from the exhaust gases to the intake air. The other version of the membrane is a partial hemisphere so as to withstand high differential pressures. This version has a separate honeycomb or grid pattern to stagnate and thus insulate intake air.

Further details and features of this invention will be set forth in the following specification, claims and drawing, in which, briefly:

Figure 2:
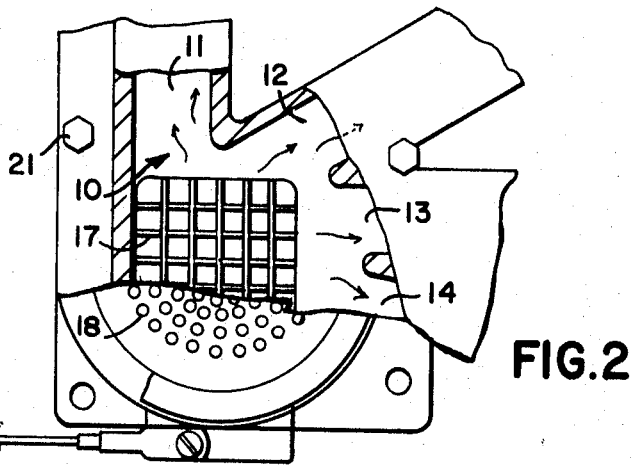
FIG. 2 is a top view of the vaporizer shown in FIG. 1 with a portion of the upper cellular structure thereof and a portion of the intake manifold broken away to show a portion of the convoluted membrane positioned beneath the cellular structure.

Referring to the drawing in detail, reference numeral 10 designates the intake manifold of a conventional internal combustion engine and this intake manifold is provided with several branches or passages 11, 12, 13 and 14 as shown in FIG. 2 which lead to the first, second, third and fourth cylinders of the engine so that fuel supplied from the bottom port of the carburetor 15 when the throttle valve 16 is opened is supplied to all of the cylinders of the engine. Some of the fuel supplied from the bottom port of the carburetor 15 is in vaporized form and this mixed with air enters the different passages to the engine cylinders.

However, some of the fuel leaving the carburetor is in the form of liquid drops and these enter the honeycomb or grid pattern member 17 and flow down to the vaporizer membrane 18. Some of the liquid drops off of the sharp annular surface 10a instead of flowing down on the inner surface of the manifold. The membrane 18 is made of thin stainless steel or similar material such as Inconel-X or the like which has resistance to heat oxidation but is also a good heat conductor. Membrane 18 is approximately 0.005 to 0.010 inches thick so that it has extremely low heat mass to provide rapid heating thereof and improve rapid starting capability of the engine.

Membrane 18 is clamped between two heat insulating gaskets or rings 19 and 20 by bolts 21 which extend from the intake manifold 10 to the exhaust manifold 22. Gaskets 19 and 20 also provide electrical insulation so that the membrane 18 is insulated from the intake and exhaust manifolds and these gaskets also reduce heat passage from the exhaust manifold 22 to the intake manifold 10. Membrane 18 makes electrical contact with metal members such as members 23 and 24 shown in FIG. 4 which are provided with terminals 25 and 26, respectively, so that the membrane 18 may be connected across the automobile battery 27 shown in the wiring diagram FIG. 6, when the starting switch 28 is closed. The membrane is heated to approximately 400° F. in 2 or 3 seconds by the electric current supplied from the battery 27. Thus, the drops of fuel coming from the outlet port of the carburetor 15 and dropping down upon the membrane 18 are vaporized rapidly and this fuel vapor enters the intake manifold passages 11–14.

Figure 1:
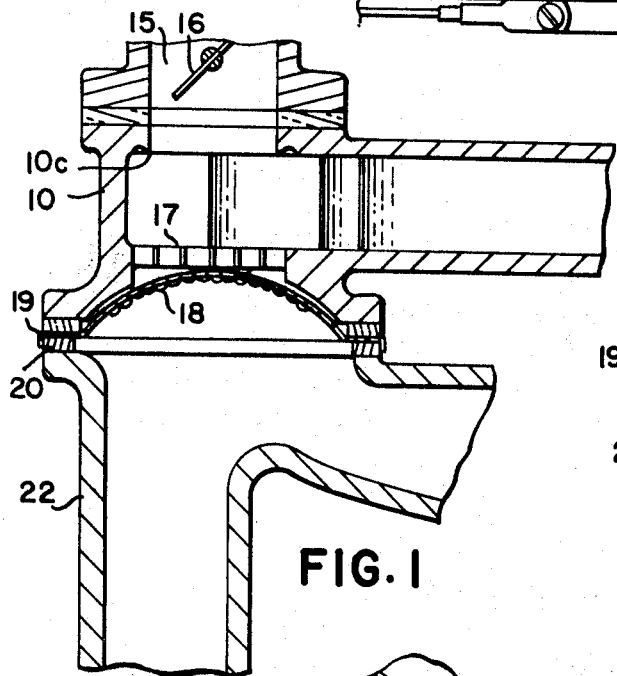
FIG. 1 is a vertical sectional view showing the vaporizer assembly positioned between the intake and exhaust manifolds of the engine.
Figure 3:
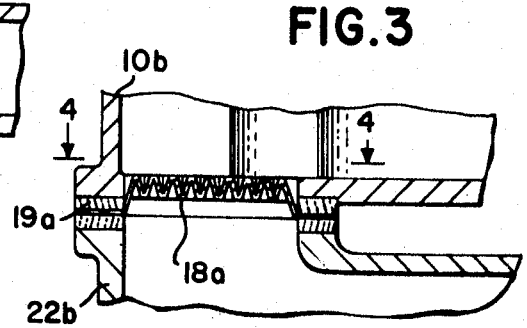
FIG. 3 is a vertical sectional view through a modified form of fuel vaporizer.
Figure 5:
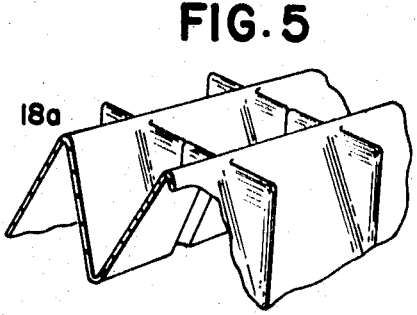
FIG. 5 is a fragmentary view in perspective of the convoluted diaphram shown in FIGS. 3 and 4.

The membrane 18 may be smooth or it may be provided with recesses, convolutions or pleats of different shapes. The membrane illustrated in FIGS. 1 and 2 can be provided simply with dimples spread substantially over the entire top surface thereof for receiving the fuel drops so that these fuel drops are distributed in small pockets over the upper surface of e membrane. However, the membrane may be shaped as shown in FIG. 5, and this shape of membrane may be either bowed as shown in FIG. 1 or it may be horizontal as shown in FIG. 3. This permits the use of thin (0.005 to 0.010 inch) membranes while withstanding relatively high pressure differentials caused by backfiring, etc.

Figure 4:
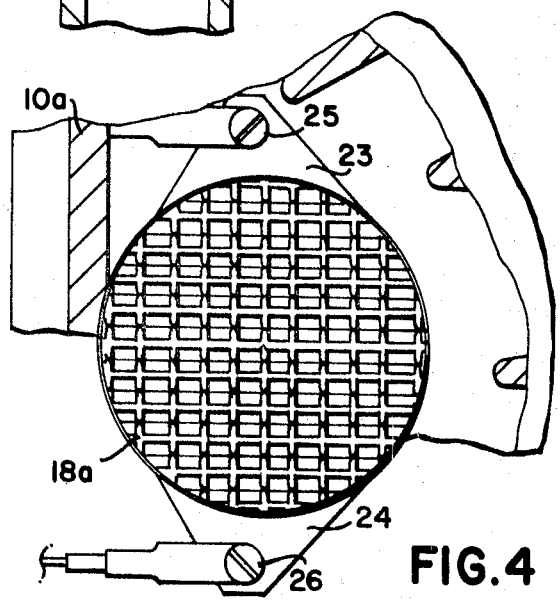
FIG. 4 is a slightly enlarged view taken along the line 4—4 of FIG. 3.

The membrane 18a shown in FIGS. 4 and 5 is formed into accordion-type pleats that are crimped at one-quarter-inch intervals. Opposing crimps meet and form partitions of cells between the pleats which face the intake manifold. These cells, while permitting heavy fuel droplets to enter, will stagnate the intake air, thus providing heat insulation without requiring a separate honeycomb or grid pattern and receive the unvaporized fuel dropping from the carburetor. Fuel thus captured in the membrane cells is vaporized, first by heating the membrane electrically during the starting of the engine and then by heating the membrane through contact of the bottom thereof with the exhaust gases passing through the exhaust manifold after the engine has started.

In the embodiment of this invention as shown in FIG. 3 the membrane 18a is clamped between the intake manifold 10b and the exhaust manifold 22b. Suitable insulating members 19a are positioned between these manifolds to decrease the heat transference from the exhaust manifold to the intake manifold. Membrane 18a is clamped between the members 19a and the manifolds are held clamped against the insulation members by bolts such as the bolts 21 shown in FIG. 2.

Figure 6:
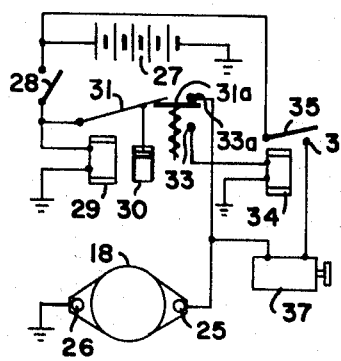
FIG. 6 is a schematic wiring diagram of the engine battery, starter and vaporizer circuit.

In considering the operation of this device reference will be made to the electrical wiring diagram shown in FIG. 6 which is provided with a battery 27 of the conventional automobile type, and a starting switch 28. When the starting switch 28 is closed the winding of the relay 29 is energized. The relay 29 is provided with an armature 31 and a pneumatic type of delay device 30 which is provided with a piston that is connected mechanically to the armature 31 to delay the movement thereof. When the relay is energized it attracts the armature 31 and causes it to press down on the spring-biased member 31a which normally engages contact 33a so that an electric current flows through the membrane 18 for 2 or 3 seconds, thereby causing the temperature of this diaphram or membrane to rise to approximately 400° F. before the armature 31 of the relay moves member 31a from contact 33a to contact 33.

Closing the circuit to contact 33 provides an electric current to the motor starting relay 34 which is provided with an armature 35 and a contact 36. When the circuit between the armature 35 and contact 36 is closed an electric current flows through the starting motor 37 and through the membrane 18. Thus, since the membrane 18 is connected in a series with the starting motor 37 heating thereof is continued, but to a lesser extent, to prevent overheating of the membrane, by starting current supplied to the motor 37 during the engine starting interval. After the engine is started the hot exhaust gases sweep against the bottom surface of the membrane and the heating thereof is continued by these gases as long as the engine is in operation. In V-8 engines, where the exhaust plumbing to the vaporizer is more difficult to arrange, a continuous electrical current may be used to heat the membrane even after the engine has started. This current may be thermostatically controlled and, though requiring a larger generator, eliminates the need for exhaust gas plumbing to the vaporizer.

While I have shown and described a preferred embodiment of the invention, it will be understood that the invention is capable of variation and modification from the form shown so that the scope thereof should be limited only by the scope of the claims appended hereto.

I claim:
1. In a device for rapid vaporization of fuel entering the intake manifold of the engine from the carburetor or fuel injector in the form of liquid drops, the combination of a thin metal membrane, means supporting said membrane with a side exposed to and directly below the underside of the engine carburetor, the underside of said membrane being exposed in the exhaust manifold of the engine, the upper side of said membrane having a honeycomb or grid pattern providing a plurality of small cavities for reducing heat transfer to the intake air through air stagnation, said upper side of said membrane receiving the drops of fuel falling from the carburetor into the intake manifold of the engine, said supporting means including insulation above and below the peripheral portions of said membrane, said supporting means insulating said membrane from said intake manifold and from said exhaust manifold, said membrane being rapidly heated during the starting of the engine to vaporize said drops of fuel.

2. In a device for rapidly vaporizing fuel entering the intake manifold of the engine from the carburetor or fuel injector in the form of liquid drops, the combination as set forth in claim 1, further comprising means connecting said membrane to a source of current supply so that said membrane is heated by electric current passing therethrough.

3. In a device for rapidly vaporizing fuel entering the intake manifold of the engine from the carburetor or fuel injector in liquid droplet for, the combination of a thin metal membrane having a honeycomb or grid pattern, means supporting said membrane with the underside thereof exposed in the exhaust manifold of the engine thereby permitting rapid passage of exhaust gases to heat up the membrane from the exhaust side, said means supporting said membrane with the top side thereof in the intake manifold directly below the underside of the engine carburetor thereby stagnating some intake air in cavities formed by said honeycomb or grid and thus insulating intake air and reducing heat transfer from exhaust to intake air, while permitting rapid heating of the fuel droplets.

4. In a device for rapid vaporization of fuel entering the intake manifold of the engine from the carburetor or fuel injector in the form of liquid drops, the combination of a thin metal membrane, means supporting said membrane with a side exposed to and directly below the underside of the engine carburetor, the upper side of said membrane having a plurality of small cavities for reducing heat transfer to the intake air through air stagnation, said upper side of membrane receiving the drops of fuel falling from the carburetor into the intake manifold of the engine, said membrane being rapidly heated during the starting of the engine to vaporize said drops of fuel, said cavities in said membrane being formed by providing a plurality of parallel pleats in said membrane and providing a plurality of opposed crimps into adjacent sides of said pleats, said opposed crimps engaging each other, resulting in one piece membrane that has high heat transfer coefficients on one side, and low heat transfer on the opposite side.

5. In a device as set forth in claim 4, further characterized in that said membrane comprises an air stagnating device in having shaped pockets to reduce heat transfer from its surface to the engine intake air, said device being shaped to provide a gastight barrier between the engine intake manifold and exhaust manifold that withstands cyclical and high differential pressures in relation to its material thickness.

* * * * *